(12) United States Patent
Edwards et al.

(10) Patent No.: US 8,486,575 B2
(45) Date of Patent: Jul. 16, 2013

(54) PASSIVE HYDROGEN VENT FOR A FUEL CELL

(75) Inventors: Leroy M Edwards, Rochester, NY (US); Clark G Hochgraf, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1975 days.

(21) Appl. No.: 10/772,699

(22) Filed: Feb. 5, 2004

(65) Prior Publication Data
US 2005/0175873 A1    Aug. 11, 2005

(51) Int. Cl.
*H01M 2/12* (2006.01)
*H01M 8/04* (2006.01)

(52) U.S. Cl.
USPC .............. 429/433; 429/436; 429/437; 429/71

(58) Field of Classification Search
None
See application file for complete search history.

(56) References Cited

U.S. PATENT DOCUMENTS

| | | | |
|---|---|---|---|
| 4,168,349 A * | 9/1979 | Buzzelli | 429/14 |
| 4,344,832 A | 8/1982 | Dahlberg | |
| 4,769,297 A | 9/1988 | Reiser et al. | |
| 5,108,849 A | 4/1992 | Watkins et al. | |
| 5,230,966 A | 7/1993 | Voss et al. | |
| 5,252,410 A | 10/1993 | Wilkinson et al. | |
| 5,264,299 A | 11/1993 | Krasij et al. | |
| 5,300,370 A | 4/1994 | Washington et al. | |
| 5,482,680 A | 1/1996 | Wilkinson et al. | |
| 5,514,487 A | 5/1996 | Washington et al. | |
| 5,521,018 A | 5/1996 | Wilkinson et al. | |
| 5,547,776 A | 8/1996 | Fletcher et al. | |
| 5,623,390 A * | 4/1997 | Noda et al. | 361/679.02 |
| 5,624,769 A | 4/1997 | Li et al. | |
| 5,641,586 A | 6/1997 | Wilson | |
| 5,663,113 A | 9/1997 | Midorikawa et al. | |
| 5,686,199 A | 11/1997 | Cavalca et al. | |
| 5,707,755 A | 1/1998 | Grot | |
| 5,769,909 A | 6/1998 | Bonk et al. | |
| 5,773,160 A | 6/1998 | Wilkinson et al. | |
| 5,776,624 A | 7/1998 | Neutzler | |

(Continued)

FOREIGN PATENT DOCUMENTS

| | | |
|---|---|---|
| FR | 2810795 | 12/2001 |
| WO | WO 94/09519 | 4/1994 |
| WO | WO 00/17952 | 3/2000 |

OTHER PUBLICATIONS

3M Novec Engineered Fluid HFE-8401HT, "A New Heat Transfer Fluid with Unique Heat Transfer Properties," pp. 1-7 (1999).

*Primary Examiner* — K. Walker
(74) *Attorney, Agent, or Firm* — Quinn Law Group, PLLC

(57) ABSTRACT

A fuel cell has a hydrogen flow path adapted to pass hydrogen into communication with an anode catalyst of an MEA. A coolant flow path is adapted to pass coolant through the fuel cell to cool the fuel cell. An enclosure encompasses at least a portion of the hydrogen flow path, the coolant flow path, or both. A hydrogen vent is adapted to vent hydrogen from the enclosure without reliance upon any electrical device. The hydrogen vent can prevent a frame front from passing into the enclosure and can be made of a porous material such as cellulose, plastic (for example, a foamed plastic) or metal (for example a sintered metal). A method of manufacturing a fuel cell includes passively venting hydrogen to maintain a hydrogen concentration level within the enclosure below about 4 percent. Additional enclosures with hydrogen vents may also be provided.

15 Claims, 2 Drawing Sheets

U.S. PATENT DOCUMENTS

| | | | |
|---|---|---|---|
| 5,804,326 A | 9/1998 | Chow et al. | |
| 5,846,668 A | 12/1998 | Watanabe | |
| 5,874,182 A | 2/1999 | Wilkinson et al. | |
| 5,928,807 A | 7/1999 | Elias | |
| 5,945,232 A | 8/1999 | Ernst et al. | |
| 5,981,098 A | 11/1999 | Vitale | |
| 6,013,385 A * | 1/2000 | DuBose | 429/17 |
| 6,054,228 A | 4/2000 | Cisar et al. | |
| 6,099,984 A | 8/2000 | Rock | |
| 6,146,779 A | 11/2000 | Walsh | |
| 6,159,626 A | 12/2000 | Keskula et al. | |
| 6,159,629 A | 12/2000 | Gibb et al. | |
| 6,174,616 B1 | 1/2001 | Marvin et al. | |
| 6,186,254 B1 | 2/2001 | Mufford et al. | |
| RE37,284 E | 7/2001 | Li et al. | |
| 6,261,710 B1 | 7/2001 | Marianowski | |
| 6,277,509 B1 * | 8/2001 | Wheeler | 429/17 |
| 6,306,354 B1 | 10/2001 | Szydlowski et al. | |
| 6,309,773 B1 | 10/2001 | Rock | |
| 6,322,919 B1 | 11/2001 | Yang et al. | |
| 6,358,642 B1 | 3/2002 | Griffith et al. | |
| 6,360,835 B1 | 3/2002 | Skala | |
| 6,372,376 B1 | 4/2002 | Fronk et al. | |
| 6,376,112 B1 | 4/2002 | Clingerman et al. | |
| 6,503,653 B2 | 1/2003 | Rock | |
| 2002/0114984 A1* | 8/2002 | Edlund et al. | 429/19 |
| 2002/0160245 A1* | 10/2002 | Genc | 429/26 |
| 2003/0064266 A1* | 4/2003 | Ogami et al. | 429/32 |
| 2003/0118881 A1* | 6/2003 | Walsh et al. | 429/25 |
| 2003/0232228 A1* | 12/2003 | Grasso | 429/26 |
| 2004/0001982 A1* | 1/2004 | Reiser et al. | 429/13 |
| 2004/0062964 A1* | 4/2004 | Matsuoka et al. | 429/26 |
| 2004/0151962 A1* | 8/2004 | Adams | 429/34 |
| 2004/0175608 A1* | 9/2004 | Lisi et al. | 429/38 |
| 2005/0058861 A1* | 3/2005 | Pettit et al. | 429/22 |
| 2005/0106438 A1* | 5/2005 | Hobmeyr | 429/32 |

* cited by examiner

PASSIVE HYDROGEN VENT FOR A FUEL CELL

FIELD OF THE INVENTION

The present invention relates to fuel cells; and more particularly, to various enclosures in a fuel cell system.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. The oxygen can be either a pure form ($O_2$) or air (a mixture of $O_2$ and N2). PEM fuel cells include a membrane electrode assembly (MEA) comprising a thin, proton transmissive, non-electrically conductive, gas impermeable, solid polymer electrolyte membrane having the anode catalyst on one face and the cathode catalyst on the opposite face. The MEA is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. By way of example, some typical arrangements for multiple cells in a stack are shown and described in U.S. Pat. No. 5,763,113.

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

In a fuel cell stack, a plurality of cells are stacked together in electrical series while being separated by a gas impermeable, electrically conductive bipolar plate. In some instances, the bipolar plate is an assembly formed by securing a pair of thin metal sheets having reactant flow fields formed on their external face surfaces. Typically, an internal coolant flow field is provided between the metal plates of the bipolar plate assembly. Various examples of a bipolar plate assembly of the type used in PEM fuel cells are shown and described in commonly-owned U.S. Pat. No. 5,776,624.

Hydrogen has been known to accumulate in the coolant system of the fuel cell. For example, hydrogen has been found to migrate into the coolant flow field and accumulate in the cooling system. Hydrogen may also disassociate from the coolant itself. Previous approaches to venting accumulated hydrogen from a fuel cell have included use of a hydrogen detector and/or fan to actively ventilate the reservoir. These electrical devices consume electricity, reducing the efficiency of the fuel cell. In addition, they can result in ventilating coolant vapor, thereby evaporating the coolant.

SUMMARY OF THE INVENTION

The present invention is capable of eliminating one or more of the disadvantages discussed above. In addition, it has been discovered that hydrogen may also accumulate in a fuel cell housing enclosure and/or in fuel cell system enclosures other than the coolant flow path. For example, hydrogen may leak from various pipes and fittings of the hydrogen flow path, including the hydrogen supply. Certain aspects of the present invention can also enable the venting of accumulated hydrogen from these other enclosures of a fuel cell.

In accordance with one aspect of the present invention a fuel cell is provided. The fuel cell has a hydrogen flow path adapted to pass hydrogen into communication with an anode catalyst of an MEA. A coolant flow path is adapted to pass coolant through the fuel cell to cool the fuel cell. An enclosure encompasses at least a portion of the hydrogen flow path, the coolant flow path, or both. A hydrogen vent is adapted to vent hydrogen from the enclosure without reliance upon any electrical device.

In accordance with another aspect of the present invention a method of manufacturing a fuel cell is provided. The method includes creating a hydrogen fuel flow path to conduct hydrogen through the fuel cell. An enclosure is created which captures hydrogen that leaks, directly or indirectly, from the hydrogen flow path. The concentration of hydrogen which leaks into the enclosure is passively maintained below a level of about 4 percent.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
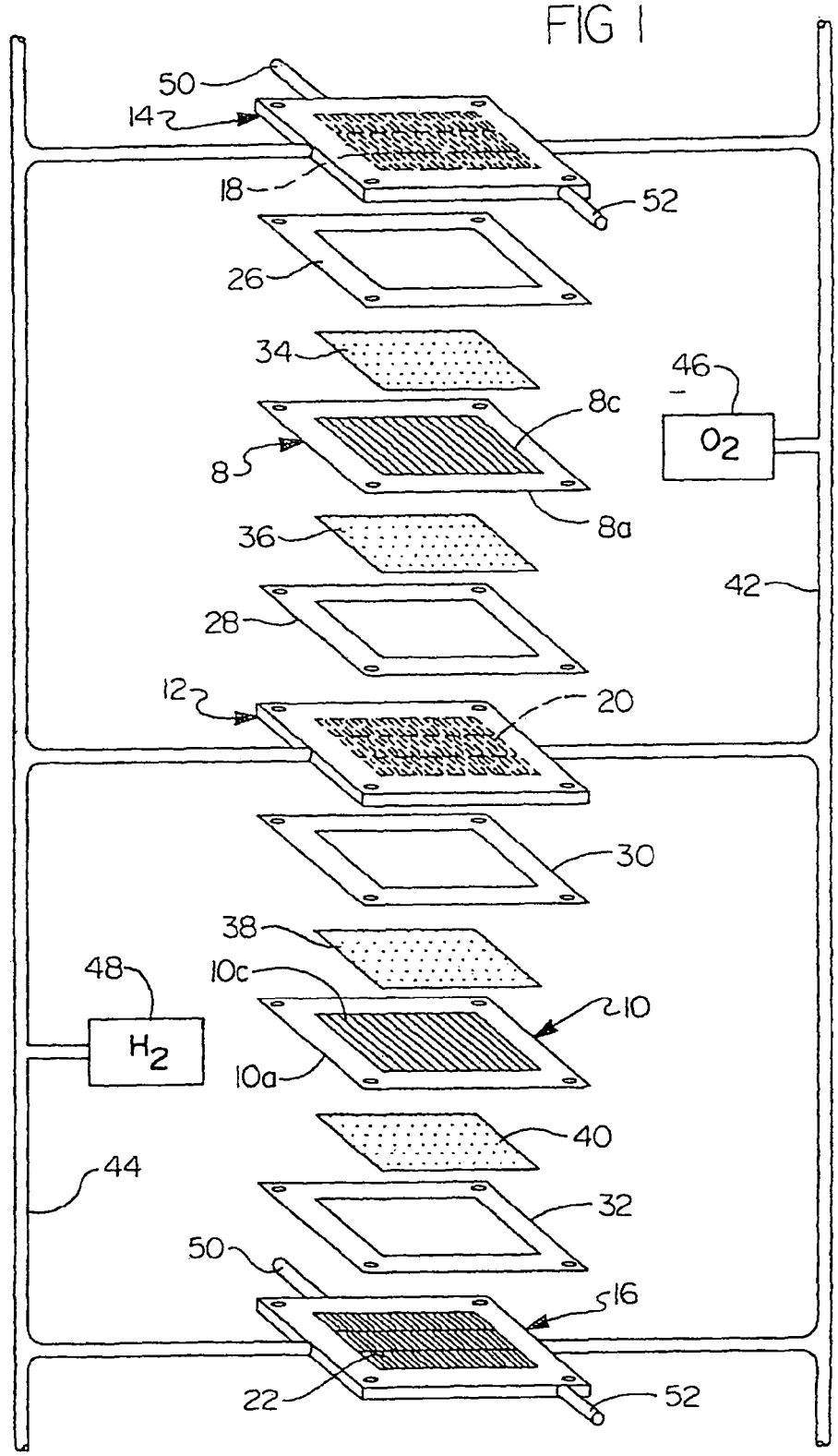
FIG. 1 is an exploded isometric view of a PEM fuel stack.

FIG. 1 schematically depicts a partial PEM fuel cell stack having a pair of membrane-electrode-assemblies (MEAs) 8 and 10 separated from each other by a non-porous, electrically-conductive bipolar plate 12. Each of the MEAs 8, 10 have a cathode face 8c, 10c and an anode face 8a, 10a. The MEAs 8 and 10, and bipolar plate 12, are stacked together between non-porous, electrically-conductive, liquid-cooled bipolar plates 14 and 16. The bipolar plates 12, 14 and 16 each include flow fields 18, 20 and 22 having a plurality of flow channels formed in the faces of the plates for distributing fuel and oxidant gases (i.e., $H_2$ & $O_2$) to the reactive faces of the MEAs 8 and 10. Nonconductive gaskets or seals 26, 28, 30, and 32 provide a seal and electrical insulation between the several plates of the fuel cell stack. Porous, gas permeable, electrically conductive sheets 34, 36, 38 and 40 press up against the electrode faces of the MEAs 8 and 10 and serve as primary current collectors for the electrodes. Primary current collectors 34, 36, 38 and 40 also provide mechanical supports for the MEAs 8 and 10, especially at locations where the MEAs are otherwise unsupported in the flow field. Suitable primary current collectors include carbon/graphite paper/cloth, fine mesh noble metal screens, open cell noble metal foams, and the like which conduct current from the electrodes while allowing gas to pass therethrough.

Bipolar plates 14 and 16 press up against the primary current collector 34 on the cathode face 8c of MEA 8 and primary current collector 40 on the anode face 10a of MEA 10, while the bipolar plate 12 presses up against the primary current collector 36 on the anode face 8a of MEA 8 and against the primary current collector 38 on the cathode face 10c of MEA 10. An oxidant gas such as oxygen or air is supplied to the cathode side of the fuel cell stack from a storage tank 46 via appropriate supply plumbing 42. Similarly, a fuel such as hydrogen is supplied to the anode side of the fuel cell from a storage tank 48 via appropriate supply plumbing 44. In a preferred embodiment, the oxygen tank 46 may be eliminated, and air supplied to the cathode side from the ambient. Likewise, the hydrogen tank 48 may be eliminated and hydrogen supplied to the anode side from a reformer which catalytically generates hydrogen from methanol or a liquid hydrocarbon (e.g., gasoline). Exhaust plumbing (not shown) for both the $H_2$ and $O_2$/air sides of the MEAs is also provided for removing $H_2$-depleted anode gas from the anode flow field and $O_2$-depleted cathode gas from the cathode flow field. Coolant plumbing 50 and 52 is provided for supplying and exhausting liquid coolant to the bipolar plates 14 and 16, as needed. Each of the bipolar plates 14 and 16 include a plurality of flow channels forming a coolant flow field.

Figure 2:
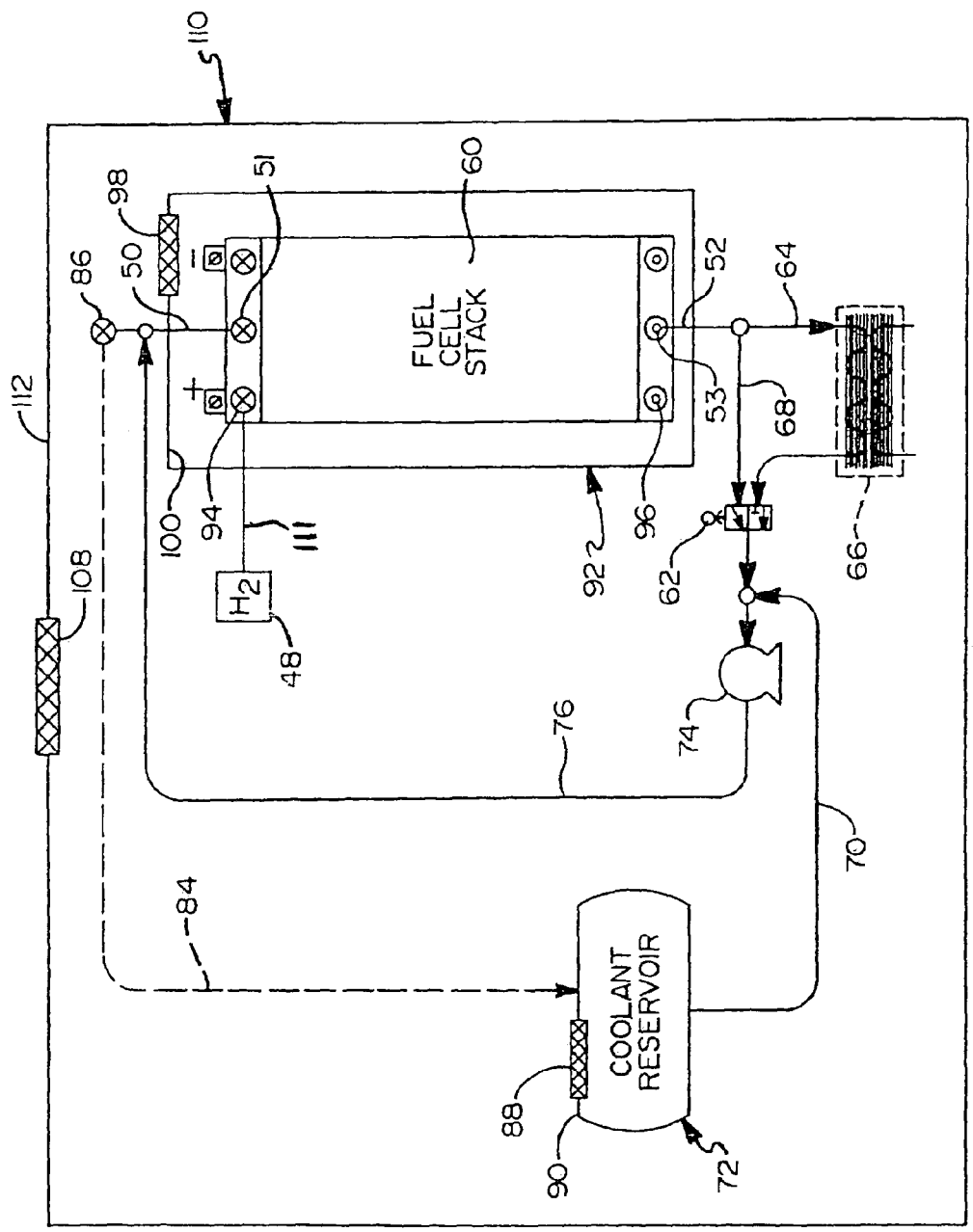
FIG. 2 is a schematic view of a fuel cell including various enclosures, each having a hydrogen vent according to the present invention.

Referring to FIG. 2, a cooling system for a fuel cell stack 60 is illustrated. The cooling system includes inlet line or pipe 50 in fluid communication, via an appropriate manifold to the coolant flow fields of bipolar plates 14 and 16. After traveling through the coolant flow fields, the coolant passes out of the fuel cell stack 60 via an appropriate header to coolant outlet line 52. An electronic control valve 62 controls passage of the coolant through bypass line 68 and/or through line 64 to a radiator and/or fan 66. Thus, as the temperature of the fuel cell 60 increases, more of the coolant flows through the radiator 66 under the influence of the control valve 62. Upon exiting the control valve 62, the coolant from the fuel cell stack 60 mixes with coolant flowing from the coolant reservoir 72 through line 70, as necessary.

A pump 74 pumps the coolant back into the fuel cell stack 60 via line or pipe 76. A drain line 84 is also provided to permit coolant to be drained from the fuel cell stack 60 into the coolant reservoir 72 by manipulation of a drain valve 86. As the coolant travels through the fuel cell stack 60 it comes into close proximity to hydrogen also traveling through the fuel cell stack 60. In some cases, for example, the hydrogen and the coolant may be traveling in adjacent channels of their respective flow fields separated only by a sealant. Hydrogen has the potential to migrate into the coolant flow channels or the enclosure that defines the coolant flow path.

Any hydrogen that might have migrated into the coolant enclosure tends to accumulate in the highest point within the coolant system. Typically, this highest point is in the coolant reservoir 72. Consequently, it is desirable to locate a hydrogen vent 88 in a wall of the coolant enclosure defining the flow path; preferably in a wall 90 of the coolant reservoir 72. The coolant flow path is defined by the enclosure created by, e.g., the flow channels in the fuel cell stack 60, the coolant reservoir 72 and the lines 50, 52, 64, 68, 70 and 76. Thus, the hydrogen vent 88 may be placed within a wall of any of these enclosure components of the coolant flow path.

The hydrogen vent 88 of this embodiment is adapted to allow hydrogen to pass therethrough while simultaneously preventing any coolant (including evaporating coolant vapor) from passing therethrough. In addition, the hydrogen vent 88 is preferably adapted to prevent a frame front from passing into the enclosure through the hydrogen vent 88. The hydrogen vent 88 provides pores (represented by the cross-hatching) which are sufficiently large to allow hydrogen molecules to pass therethrough. The pores are also preferably sufficiently small that coolant, including coolant vapors, cannot pass therethrough. Thus, the hydrogen vent 88 is passive. As used herein "passive" means that the hydrogen vent does not require any electrical or other active components to function. For example, the hydrogen vent 88 requires no electrical components such as a sensor, controller, or fan are required.

In addition, the hydrogen vent 88 is preferably adapted to passively vent hydrogen such that the hydrogen remains below about 4 percent within the enclosure 72; and more preferably, below about 1 percent. The hydrogen vent 88 is preferably made of a porous material selected from the group consisting of cellulose, plastic (for example, a foamed plastic) or metal (for example, a sintered metal).

The fuel cell system has various enclosures, including a fuel cell stack enclosure 92. This fuel cell stack enclosure 92 encompasses an area surrounding a part of the coolant flow path. For example, it includes inlet coolant 51, the coolant flow fields, and coolant outlet 53. Similarly, the fuel cell enclosure 92 includes an area surrounding a part of the hydrogen flow path and the oxygen flow path. With respect to the hydrogen flow path, for example, the fuel cell enclosure surrounds the inlet 94, hydrogen flow field, and the outlet 96.

The fittings and headers which connect the various components of the hydrogen flow path within the fuel cell enclosure 92 are potential sources for hydrogen leaks. Similarly, hydrogen which may have migrated into the cooling system may potentially leak from corresponding fittings and manifolds from the coolant flow path within the fuel cell enclosure 92. Thus, a hydrogen vent 98 is located within a wall 100 of the fuel cell enclosure 92. This hydrogen vent 98 has the same properties discussed above with respect to the hydrogen vent 88 of the coolant flow reservoir 72.

The fuel cell system enclosure defining the coolant flow path, including lines 50, 52, 64, 68, 76 and reservoir 72, the hydrogen supply tank 48 and the fuel cell enclosure 92 are all located within an overall fuel cell system enclosure 110. This system enclosure 110 encompasses an area surrounding the coolant reservoir 72 and the fuel cell stack enclosure 92. Thus, hydrogen vented through the hydrogen vent 88 of the coolant reservoir 72 or through the hydrogen vent 98 of the fuel cell enclosure 92 is still contained within the system enclosure 110. In addition, the hydrogen supply tank 48 is located within the system enclosure 110. As indicated previously, the hydrogen tank 48 may be replaced with a reformer. Thus, the entire hydrogen flow path is enclosed within the system enclosure 110, although $H_2$-depleted gas leaving the fuel cell stack 60 via outlet 96 exits the system enclosure 110.

As indicated above, this system enclosure 110 includes various potential hydrogen sources. For example, hydrogen may be vented into the system enclosure 110 by the coolant reservoir 72 hydrogen vent 88 or by the fuel cell enclosure 92 hydrogen vent 98. In addition, hydrogen may potentially leak from the hydrogen supply tank 48 or reformer and associated hydrogen flow lines 111 and fittings. Thus, a hydrogen vent 108 is located within a wall 112 of the system enclosure 110 to vent hydrogen to the atmosphere. This hydrogen vent 108 has the same properties discussed above with respect to the previously identified hydrogen vents 88, 98.

Of course, many alternatives to the previously described preferred embodiment can be envisioned by those skilled in the art based upon the above description. For example, the hydrogen supply tank may be located outside of the system enclosure, but have its own hydrogen supply enclosure encompassing the area around the hydrogen supply tank. In addition, an oxygen supply tank may additionally be located within the system enclosure of FIG. 2.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell comprising:
   a hydrogen flow path configured to pass hydrogen into communication with an anode catalyst of an MEA;
   a coolant flow path configured to pass coolant through the fuel cell to cool the fuel cell, the coolant flow path comprising a coolant reservoir;
   a first enclosure encompassing at least a part of the coolant flow path;
   a first passive hydrogen vent configured to vent hydrogen from the first enclosure without reliance upon any electrical device or other active components to function and configured to maintain the hydrogen concentration within the first enclosure below about 4 percent;
   a second enclosure encompassing at least a part of the hydrogen flow path; and
   a second hydrogen vent configured to vent hydrogen from the second enclosure.

2. A fuel cell according to claim 1, wherein the second enclosure surrounds a member selected from the group consisting of a fuel cell stack through which the hydrogen flow path and the coolant flow path pass and a hydrogen supply reservoir of the hydrogen flow path.

3. A fuel cell according to claim 1, wherein the first passive hydrogen vent and the second hydrogen vent comprise a porous material selected from the group consisting of cellulose, plastic and metal.

4. A fuel cell according to claim 1, wherein the first enclosure comprises the coolant reservoir and the first passive hydrogen vent is located within a wall of the coolant reservoir.

5. A fuel cell according to claim 4, wherein the first passive hydrogen vent is further configured to substantially prevent the coolant from passing through the vent.

6. A fuel cell according to claim 1, wherein the first passive hydrogen vent and the second hydrogen vent are configured to maintain a hydrogen concentration within the enclosure below about 1 percent without reliance upon any electrical device.

7. A fuel cell according to claim 1, further comprising a third enclosure that encompasses at least one of the first enclosure and the second enclosure, the third enclosure having a third hydrogen vent.

8. A fuel cell according to claim 1, wherein the first passive hydrogen vent and the second hydrogen vent are further configured to prevent a flame front from passing through the vent.

9. A method of manufacturing an MEA fuel cell, comprising:
   creating a hydrogen fuel flow path to conduct hydrogen through the MEA fuel cell;
   creating a coolant flow path configured to pass coolant through the fuel cell to cool the fuel cell, the coolant flow path comprising a coolant reservoir;
   enclosing at least a part of the coolant flow path in a first enclosure;
   providing a first passive hydrogen vent in the first enclosure, the first passive hydrogen vent configured to passively maintain the level of hydrogen which leaks into the first enclosure below a concentration level of about 4 percent without reliance upon any electrical device or other active components to function;
   enclosing at least a part of the hydrogen fuel flow path in a second enclosure which captures hydrogen that leaks, directly or indirectly, from the hydrogen fuel flow path; and
   providing a second hydrogen vent in the second enclosure, the second hydrogen vent configured to maintain the level of hydrogen which leaks into the second enclosure below a concentration level of about 4 percent.

10. A method of manufacturing a fuel cell according to claim 9, wherein the first enclosure comprises the coolant reservoir and the first passive hydrogen vent is located within a wall of the coolant reservoir.

11. A method of manufacturing a fuel cell according to claim 10, wherein the first passive hydrogen vent passively maintains the level of hydrogen by comprising a porous material capable of passing hydrogen therethrough and capable of substantially preventing the coolant from passing therethrough.

12. A method of manufacturing a fuel cell according to claim 10, wherein passively maintaining the level of hydrogen further comprises passively maintaining the level of hydrogen which leaks into the enclosure below a concentration level of about 1 percent.

13. A method of manufacturing a fuel cell according to claim 9, wherein passively maintaining the level of hydrogen further comprises selecting a porous material capable of passing hydrogen therethrough and capable of substantially preventing a flame front from passing therethrough.

14. A method of manufacturing a fuel cell according to claim 13, wherein selecting a porous material further comprises selecting a porous material selected from the group consisting of cellulose, plastic and metal.

15. A method of manufacturing a fuel cell according to claim 9, further comprising a third enclosure that encompasses at least one of the first enclosure and the second enclosure, the third enclosure having a third hydrogen vent.

* * * * *